United States Patent [19]

Tronzano et al.

[11] Patent Number: 4,603,364
[45] Date of Patent: Jul. 29, 1986

[54] APPARATUS FOR RECORDING ON OPPOSITE FACES OF FLEXIBLE MAGNETIC DISK

[75] Inventors: Sergio Tronzano, Caluso; Carlo Vignal, Romano Canavese, both of Italy

[73] Assignee: Ing. C. Olivetti & C., S.p.A., Italy

[21] Appl. No.: 623,077

[22] Filed: Jun. 21, 1984

Related U.S. Application Data

[62] Division of Ser. No. 320,874, Nov. 11, 1981, Pat. No. 4,476,508.

[30] Foreign Application Priority Data

Nov. 14, 1980 [IT] Italy .................. 68742 A/80

[51] Int. Cl.⁴ .................................. G11B 5/54
[52] U.S. Cl. ........................... 360/105; 360/99
[58] Field of Search .............. 360/97, 99, 104–105, 360/109

[56] References Cited

U.S. PATENT DOCUMENTS

| | | | |
|---|---|---|---|
| 3,678,481 | 7/1972 | Dalziel et al. | 340/174 IC |
| 3,815,150 | 6/1974 | Stoddard et al. | 360/97 |
| 4,089,029 | 5/1978 | Castrodale et al. | 360/99 |
| 4,216,510 | 8/1980 | Manzke et al. | 360/99 |
| 4,405,957 | 9/1983 | Vorbach et al. | 360/97 X |
| 4,437,132 | 3/1984 | Shimaoka | 360/105 |

Primary Examiner—John H. Wolff
Attorney, Agent, or Firm—Banner, Birch, McKie & Beckett

[57] ABSTRACT

An apparatus for recording flexible magnetic disks contained in envelopes comprises a mandrel engageable with a central zone of the disk to rotate the disk within the envelope, and a carriage 41 which is movable radially relative to the disk and on which there is mounted a pair of magnetic heads which oppose each other and make contact with the magnetizable surfaces of the disk. The upper head is carried by a support (85) movable on the carriage and urged by a first spring (87) toward the disk. A presser pad, which presses the envelope containing the disk against a reference surface of the appartaus, is lowered by an electromagnet which also causes the upper head to lower. A lost-motion form of coupling enables the pad and upper head to carry out independently adjustable travel strokes, so minimizing any recoil. The coupling comprises a lever (100) biased by a second spring (102) which is moved by the armature after a stroke regulated by a first adjustable stop (106) to allow the contact of the upper head (84) with the disk. When the electromagnet (90) is de-energized its armature (92) retracts the pad and the lever (100) lifts off the upper head (84) but only to an extent permitted by a second adjustable stop (103).

8 Claims, 5 Drawing Figures

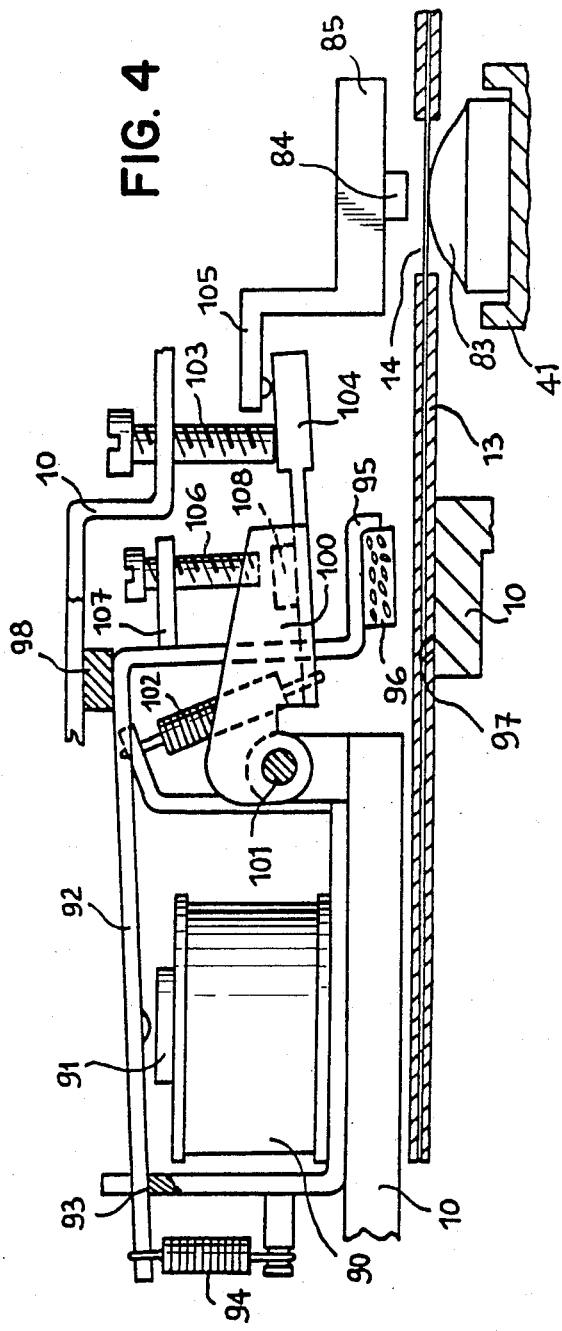
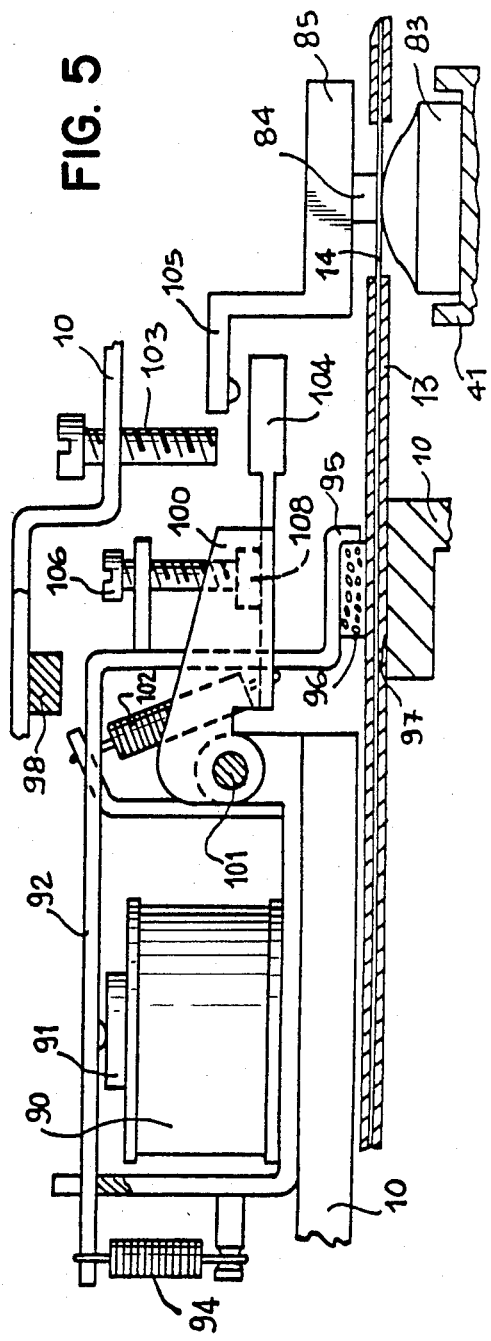

4,603,364

APPARATUS FOR RECORDING ON OPPOSITE FACES OF FLEXIBLE MAGNETIC DISK

This application is a division of application Ser. No. 320,874, filed Nov. 11, 1981, now U.S. Pat. No. 4,476,508.

BACKGROUND OF THE INVENTION

This invention relates to an apparatus for recording on flexible magnetic disks contained in envelopes and commonly known as "floppy disks". This apparatus comprises a mandrel for rotating the disk within its envelope, and a carriage movable radially relative to the disk and on which are mounted a pair of magnetic heads each to record and/or read on a corresponding face of the disk, and a presser pad which presses the envelope against a reference surface. The envelope is flattened in proximity to the recording zone of the disk, and this positions the disk in a nominal working plane.

An apparatus of this type is known in which the presser pad is fixed directly to the movable armature of an electromagnet, and in which a tongue of the armature cooperates with one of the heads in order to withdraw it from the disk plane. The presser pad and the movable head have substantially equal travel strokes. This creates drawbacks because it is in contrast with the specific requirements of the presser which requires a long travel stroke, and of the head which requires a short travel stroke. In this respect, during the non-reading stages, the travel stroke of the presser pad when raised must be sufficiently long to ensure that the paid is well removed from the envelope, so as to prevent unnecessary disk wear. In contrast, the head must withdraw from the disk by only a very small distance, just sufficient to separate it from the magnetisable surface. Under such conditions, when the head is subsequently lowered, it does not land on the disk with too high a speed, and thus does not damage its magnetisable surface.

SUMMARY OF THE INVENTION

An object of the present invention is to provide an apparatus in which a control electromagnet causes the presser pad and magnetic head to carry out independent and selectively adjustable strokes with minimum recoil, thus obviating the drawbacks of the known apparatus.

BRIEF DESCRIPTION OF THE DRAWINGS

The present invention will be described in more detail, by way of example, with reference to the accompanying drawings, in which:

FIG. 4 is a partly sectional front view of a second detail of the apparatus of FIG. 1 in the rest position; and FIG. 5 is a front view of the detail of FIG. 4 in a working position.

With reference to FIG. 1, the apparatus embodying the invention comprises a support frame 10, within which there is disposed a pair of substantially horizontal guides 11 and 12, between which an envelope 13 containing a flexible magnetic disk 14 of known type is to be inserted.

Figure 1:
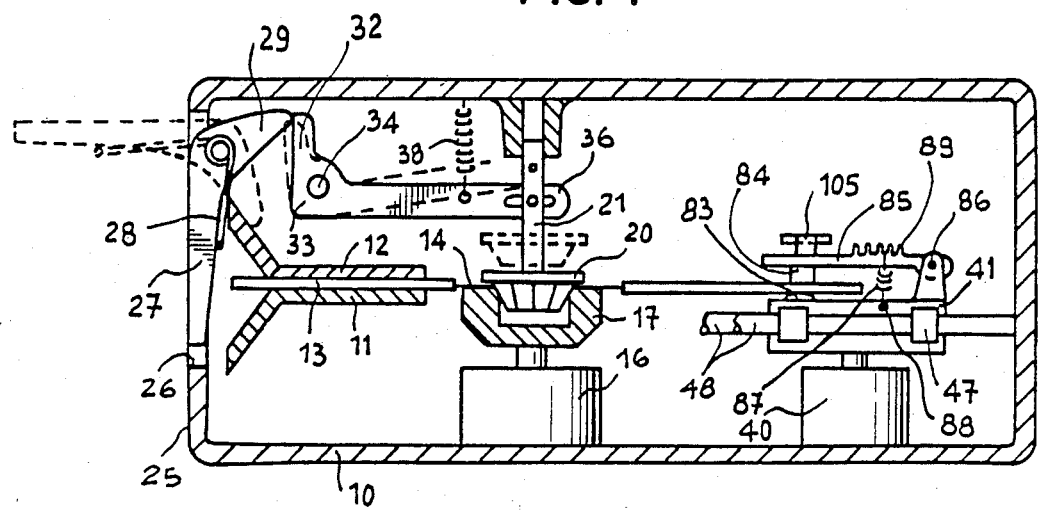
FIG. 1 is a diagrammatic partly sectional side view of an apparatus embodying the invention.

An electric motor 16, for example of the direct current type, is mounted on the frame 10 and is connected to a mandrel 17 which is arranged to cooperate with a central zone of the disk 14 in order to rotate this latter within its envelope 13. A counter-mandrel 20, also of known type, is rotatably mounted on a vertical shaft 21 coaxial to the mandrel 17, and is arranged to cooperate with the disk 14 in order to keep it pressed against the mandrel 17.

The front wall 25 (to the left in the figure) of the apparatus is provided with an aperture 26 through which the envelope 13 and disk 14 can be inserted between the guides 11 and 12.

A door 27, pivoted on a fixed pin of the frame 10, is movable between two stable positions, namely a working position and an insertion position respectively (this latter position is shown by dashed lines in the figure). A spring 28, located about the the fixed pin of the frame 10, tends to rotate the door 27 clockwise and to retain it in the insertion position. An arm 29 of the door 27 engages, in the manner of a cam, an arm 32 of an L lever 33 pivoted on a fixed pin 34 and having a second arm 36 connected to the spindle 21 of the counter-mandrel 20 by means of a pin-and-slot connection. A spring 38 tends to rotate the lever 33 in an counter-clockwise direction, and to keep the counter-mandrel 20 raised from the mandrel 17. The angle formed by the arm 29 and door 27 is greater than 90°, and the engagement between the arms 32 and 29 takes place on the same side of the spring 38 as the pins 28 and 34. Thus the spring 38 holds the door 27 in its closed working position.

Figure 2:
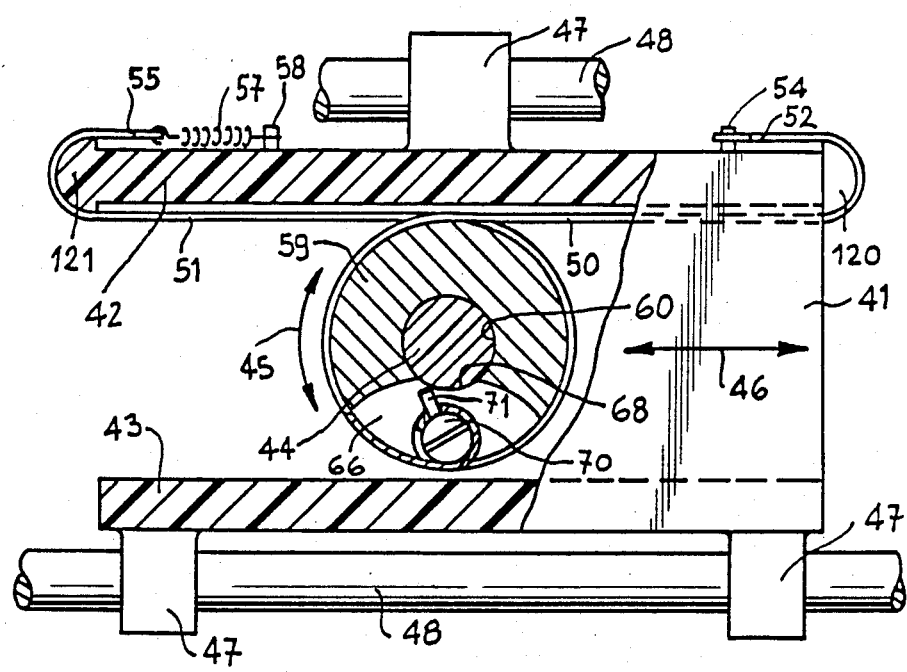
FIG. 2 is a partly sectional plan view of a detail of the apparatus of FIG. 1.

A reversible electric motor 40 of the stepping type is mounted on the frame 10 and is arranged to control the bi-directional movement of a carriage 41 radially to the disk 14. The carriage 41 is of plastics material and comprises two side pieces 42 and 43 (FIG. 2) between which an upper end of the drive shaft 44 of the motor 40 is arranged. The carriage 41 is slidable by way of lateral bushes 47 projecting from the side pieces 42 and 43 on horizontal guides 48 fixed on the frame 10.

Figure 3:
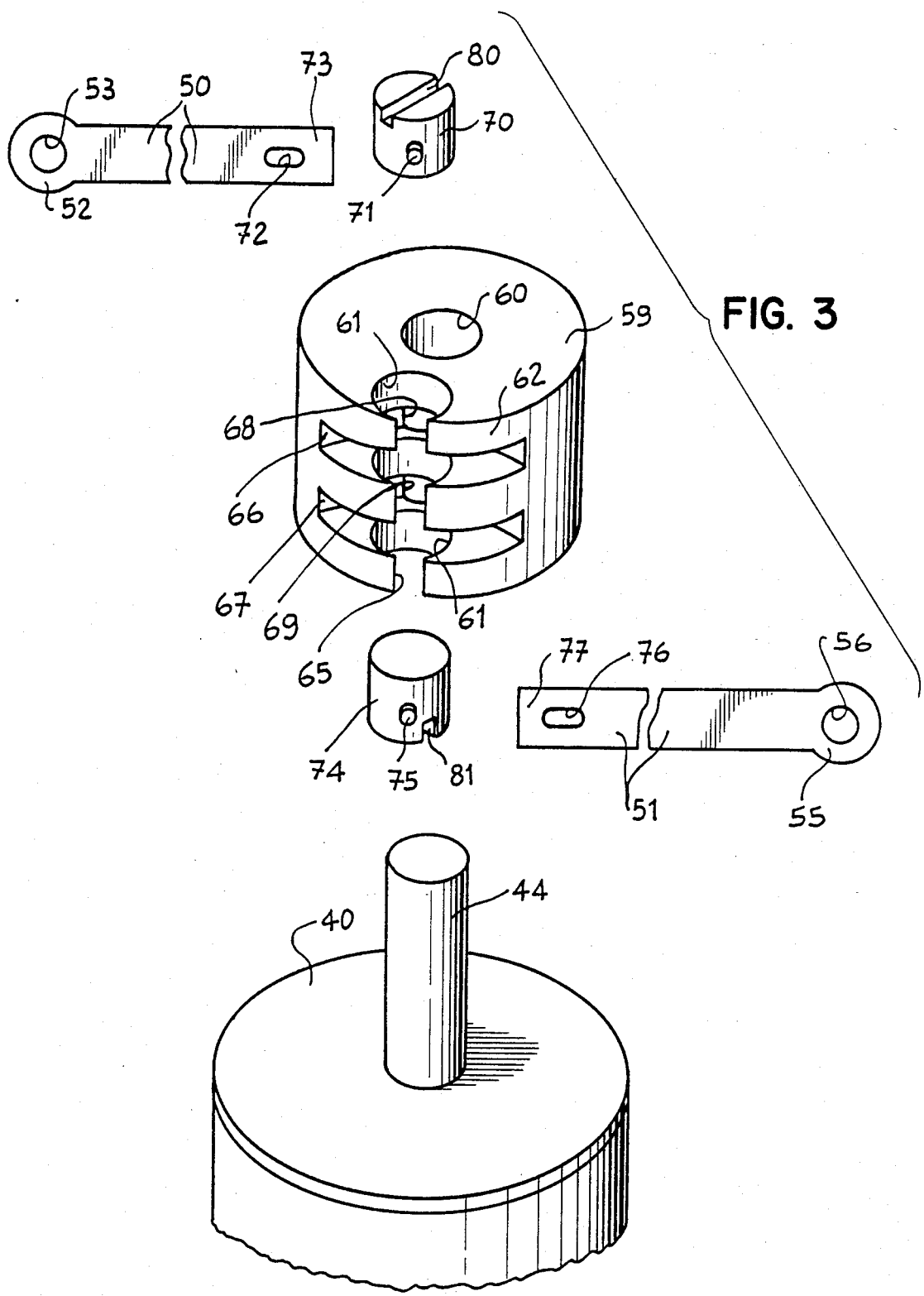
FIG. 3 is an exploded perspective view of certain parts of the detail of FIG. 2.

The transmission member which converts the rotary motion of the shaft 44 of the motor 40, indicated by the arrow 45, into bidirectional rectilinear motion of the carriage 41, indicated by the arrow 46, comprises a pair of very flexible metal strips 50 and 51 which are wound in a complementary manner through 360° about a cylindrical hub 59 fixed by a central bore 60 on to the drive shaft 44. The strips have first ends 52 and 44 respectively mounted on the carriage 42 and second ends 73 and 77 respectively mounted on the hub 59. More specifically, the end 52 of the strip 50 (FIGS. 2 and 3) is provided with a hole 53 into which there is inserted a pin 54 provided on the outside of the side piece 42 of the carriage 41. The end 55 of the strip 51 is provided with a hole 56 in which there is hooked the end of a spiral spring 57, the other end of which is hooked on to a pin 59 also provided on the outside of the side piece 42 of the carriage 41. Those parts of the two strips 50 and 51 adjacent to the ends 52 and 55 wrap through 180° about two substantially semicylindrical rounded edges 20 and 21, and are disposed parallel to the guides 48 along the inside of the side piece 42.

According to a further characteristic of the invention, the hub 59 is shaped to comprise an eccentric, axial through bore 61 of circular cross-section, which is parallel to the bore 60 and is formed tangential to, but with slight interference with, the peripheral surface 62 of the hub 59 so as to form a longitudinal slot 65 parallel to the central bore 60. Two transverse channels 66 and 67 are provided in the hub 59 in two planes orthogonal to the axis of the bore 61, so as to form two internal slots 68 and 69 which connect the central bore 60 to the eccentric bore 61.

A longitudinal pin in the form of a cylinder 70 is loosely inserted in the top of the bore 61, and has a radial peg 71 which is loosely housed in a slot 72 provided in the end 73 of the strip 50, and also housed in the upper channel 66 of the hub 59.

A cylinder 74, matching the cylinder 70, is loosely inserted into the bottom of the bore 61, with its radial peg 75 loosely housed in a slot 76 in the end 77 of the strip 51 and also housed in the lower channel 67 of the hub 59. The axial dimensions of the two cylinders 70 and 74 are also such as to leave a gap between the respective lower and upper parts when the cylinders are both inserted into the bore 61, with the respective pins 71 and 75 housed in the channels 66 and 67.

The strips 50 and 51 are mounted on the hub 59 in the following manner. The cylinder 70 is firstly inserted into the top of the eccentric bore 61 so that its radial peg 71 is lined up in the longitudinal slot 65. When the cylinder 70 has completely entered the bore 61, its peg 71 is aligned with the channel 66 and faces outwards from the hub 59. The end 73 of the strip 50 is then inserted between the cylinder 70 and the innser surface of the bore 61, towards the right in FIG. 3, so that the peg 71 becomes housed in the slot 72. The cylinder 70 is then rotated in an anti-clockwise direction, for example by using a screwdriver slot 80, until the peg 71 passes beyond the internal slot 68.

The strip 51 is mounted in a like manner. The cylinder 74 is inserted into the bottom of the eccentric bore 61 so that the radial peg 75 lines up in the longitudinal slot 65. When the cylinder 74 has completely entered the bore 61, its peg 76 is aligned with the channel 67 and faces outwards from the hub 59. The end 77 of the strip 51 is then inserted between the cylinder 74 and the inner surface of the bore 61, towards the left in FIG. 3, so that the peg 75 becomes housed in the slot 76, the two strips 50 and 51 emerging from the slot 65 then being tangential to the peripheral surface of the hub 59 and facing opposite directions relative to the slot 65. The cylinder 74 is then rotated clockwise, for example using a screwdriver slot 81, until the peg 75 passes beyond the internal slot 69.

The hub 59 on which the strips 50 and 51 have been mounted in this manner is then placed on the upper end of the shaft 44 of the motor 40. This structure is now such that the clockwise rotation of the cylinder 70 and the counter-clockwise rotation of the cylinder 74 are limited by the stop action of the shaft 44 of the motor 40 against the pegs 71 and 75. The ends 52 and 55 of the strips 50 and 51 are finally fixed to the carriage 41 in the manner already described.

From the preceding description it is apparent that the strips 50 and 51 are mounted on the hub 59 in a simple, reliable and cheap manner. The strips thus mounted are subjected neither to mutual rubbing nor to the formation of folds, because as these strips are housed slackly between the respective cylinders 70 and 71 and the inner surface of the bore 61, they automatically adapt themselves to the direction of application of the force transmitted between the shaft of the motor 40 and the carriage 41.

Finally, the fact that the ends 73 and 77 are fixed to the pegs 71 and 75 beyond the curvature of the strips about the cylinders 70 and 74 means that the thrust of the pegs 71 and 75 against the slots 72 and 76 during the acceleration and braking stages of the carriage is reduced, so eliminating fracture of the strips 50 and 51 by fatigue.

The apparatus comprises a first magnetic head 83 (FIG. 1) mounted on the carriage 41 and arranged to contact the lower face of the disk 14, and a second magnetic head 84 mounted in a position opposing the lower head 83 on the end of an arm 85 pivoted on a pin 86 of the carriage 41 and arranged to contact the upper face of the disk 14.

According to a further aspect of the invention, a spring 87 is stretched between a fixed point 88 on the carriage 41 and one of five hooks 89 provided on the arm 85 at different distances from the pin 86, so that the force with which the upper head 84 is urged downwards can be adjusted and predetermined. For example, the spring 87 and the pitch between the hooks 89 are such as to exert a force of about 17 grams on the head 84 when the spring is hooked on to the central hook 89. On moving the spring 87 progressively on to the hook 89 further from or closer to the central pin, this force respectively increases or decreases by 1 gram, so allowing operation with the otpimum force without it being necessary during manufacture to accurately select the loading of the spring 87, or alternatively making it possible to vary the working force on the head 84.

According to a further aspect of the invention, an electromagnet 90 (FIG. 4) is mounted on the frame 10 and comprises a fixed core 91 and a movable armature 92 pivoted on a fixed pint 93 and kept normally withdrawn from the core 92 by a spring 94. A presser pad 96, in the form of a sponge, is cemented to one end or arm 95 of the armature 92, and is arranged to press the envelope 13 against a reference surface 97 of the frame 10 in order to define a nominal working plane for the disk 14 during its recording and reading. When at rest, the armature 92 rests against a fixed stop 98 on the frame 10.

A lever 100 pivoted on a fixed pin 101 is pulled by a spring 102 against an adjustable stop 103, constituted for example by a screw, and has one end 104 arranged to cooperate with a lug 105 of the arm 85, on which the upper head 84 is mounted. An adjustment screw 106, screwed in a lug 107 of the armature 92, is arranged to cooperate with a bent portion 198 of the lever 100 to define a lost motion connection between the armature 92 and the lever 100.

The operation of the apparatus heretofore described is as follows. When in the rest state, without the disk inserted into the apparatus, the door 27 (FIG. 1) is in the raised insertion position, the counter-mandrel 20 is separated from the mandrel 17, the motors 16 and 40 are at rest, and the electromagnet 90 (FIG. 4) is de-energised. The upper head 84 is raised by the action of the spring 102 which holds the lever 100 against the screw 103. The distance of the upper head 84 from the lower head 83 can be adjusted by screwing the screw 103 to a greater or lesser extent into the frame 10.

It will now be assumed that it is required to record and/or read a flexible magnetic disk 14 contained in its envelope 13. After inserting the envelope 13 between the guides 11 and 12 (FIG. 1) through the front aperture 26, the door 27 is lowered into its working position shown in the figure. The arm 29 of the door 27 thus causes the lever 33 to rotate clockwise against the action of the spring 38, and moves the counter-mandrel 20 into the central bore in the disk 14, so centering this latter and pressing it against the mandrel 17.

The rotating motor 16 causes the disk 14 to rotate inside the envelope, which remains at rest. The carriage 41 is moved radially relative to the disk 14 by the motor 40 by way of the flexible strips 50 and 51, until the heads 83 and 84 are positioned on the required track of the disk on which it is intended to record and/or read binary data.

The electromagnetic 90 (FIG. 5) is energised, and the armature 92 is attracted against the core 91. The presser pad 96 thus presses the envelope 13 against the reference surface 97. During the lowering of the armature 92, when the screw 106 encounters the bent portion 108 of the lever 100 this lever is also lowered, and the upper head 84 is left free to fall under the action of the spring 87. The travel path of the lever 100 and its rest position together with the rest position of the upper head 84 relative to the head 83 can be adjusted by adjusting the screws 106 and 103 respectively. When recording and/or reading has taken place, the electromagnet 90 is de-energised so that the upper head 84 and the pad 96 return to their rest position. The motor 40 returns the carriage 41 to its rest position. On lifting the door 27, the counter-mandrel 20 is returned upwards, and the envelope 13 containing the disk 14 can be removed from the apparatus.

What we claim is:

1. An apparatus for recording on and reading from two faces of a flexible magnetic disk contained in an envelope, comprising a drive member engageable with the disk to rotate it within its envelope; a carriage movable radially relative to the disk; a pair of mutually opposing magnetic heads mounted on the carriage, each for recording on and reading from a corresponding face of the disk; head support means on said carriage for causing a first magnetic head of said pair of mutually opposing magnetic heads to be moved perpendicularly to said disk; a reference surface on the apparatus against which said envelope is pressed by a presser pad; an electromagnet having an armature arm movable through a predetermined stroke for causing the presser pad to press the envelope of said disk against said reference surface upon energization of said electromagnet; first spring means for biasing said first magnetic head against the corresponding face of said disk; and a coupling device for controlling the movement of said first head in response to the movement of said armature arm, said coupling device comprising:

an intermediate member operatively connecting said armature arm with said head support;

a first stop for defining a rest position of said intermediate member;

second spring means for urging the intermediate member against said first stop, wherein said head support means is shiftable by said intemediate member against the action of said first spring means to position said head withdrawn from the magnetic disk in the rest position of said intermediate member;

wherein said armature arm withdraws said intermediate member from said first stop against the action of said second spring means upon energization of said electromagnet to release said head support in order to enable said first magnetic head to contact said magnetic disk under the action of said first spring means; and wherein said second spring means shift said head support through said intermediate member against the action of said first spring means upon de-energization of said electromagnet to terminate the lift-off of the movable head before completion of the retraction of the presser pad by the armature arm.

2. An apparatus according to claim 1, wherein said armature arm is biased by third spring means to move the presser pad away from said reference surface and wherein said first magnetic head is lifted off the disk by said third spring means through said armature arm and said intermediate member when said electromagnet is de-energized.

3. An apparatus according to claim 1, further comprising a second stop supported by said armature arm, wherein said intermediate member comprises a lever fulcrumed on a pivot mounted fixedly with respect to said reference surface, and wherein said lever comprises a first portion for cooperating with an element of said head support means, a second portion for cooperating with said first stop and a third portion for cooperating with said second stop, and wherein said second stop and the third portion of said lever are displaced therebetween to define a lost motion coupling between said armature arm and said lever.

4. An apparatus according to claim 3, wherein said first stop comprises a support member fixed with respect to said reference surface and a regulating screw interposed between said support member and the second portion of said lever.

5. An apparatus according to claim 4, wherein said second stop comprises another regulating screw interposed between said armature arm and the third portion of said lever.

6. An apparatus according to claim 1, wherein said pad is fixed directly to said armature arm.

7. An apparatus according to claim 1, wherein said first stop is adjustable to define a rest position of said first magnetic head relative to said reference surface.

8. An apparatus according to claim 1, wherein said armature arm acts on said intermediate member by way of a lost motion coupling which is adjustable in such a manner to allow variations in the travel stroke of said intermediate element in response to a fixed travel stroke of said armature arm.

* * * * *